United States Patent [19]
Keys

[11] 3,822,864
[45] July 9, 1974

[54] WEED BARRIER FOR FENCING

[76] Inventor: Gary L. Keys, 16683 Walter, Southgate, Mich. 48195

[22] Filed: Sept. 13, 1972

[21] Appl. No.: 288,711

[52] U.S. Cl. .................................. 256/32, 256/1
[51] Int. Cl. ............................................ E04h 17/14
[58] Field of Search .............. 256/32, 33, 34, 1, 24; 248/221

[56] References Cited
UNITED STATES PATENTS

| | | | |
|---|---|---|---|
| 2,844,643 | 7/1958 | Cofer et al. | 248/221 X |
| 2,918,202 | 12/1959 | Constantine et al. | 248/221 X |
| 2,976,021 | 3/1961 | Stefan | 256/65 |
| 3,085,788 | 4/1963 | Hawkins | 256/65 |
| 3,115,213 | 12/1963 | Cloutier | 248/221 X |
| 3,388,892 | 6/1968 | Case | 256/24 X |
| 3,393,897 | 7/1968 | Wright | 256/32 |
| 3,515,373 | 6/1970 | Abbe | 256/32 |
| 3,676,952 | 1/1970 | Watts | 256/32 X |

Primary Examiner—Dennis L. Taylor

[57] ABSTRACT

A weed barrier for use in combination with fencing, wherein nestable and telescopic channel shaped members are disposed and secured along the ground and beneath intermediate each of the fence posts and beneath the fence wire, so as to inhibit weeds, vegetation, etc., from growing therebeneath. The proposed weed barrier lends an esthetic and ornamental appearance, as well as serving to facilitate the mowing of the lawn etc, adjacent to the fence.

5 Claims, 11 Drawing Figures

PATENTED JUL 9 1974    3,822,864
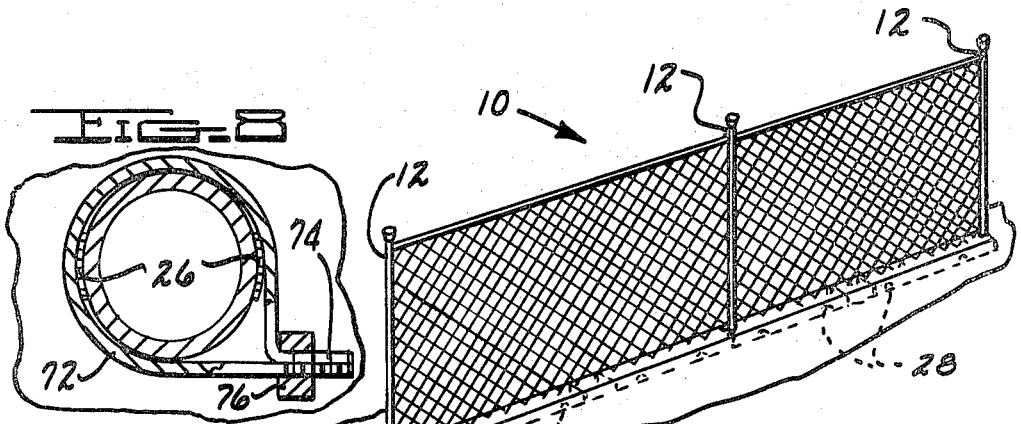
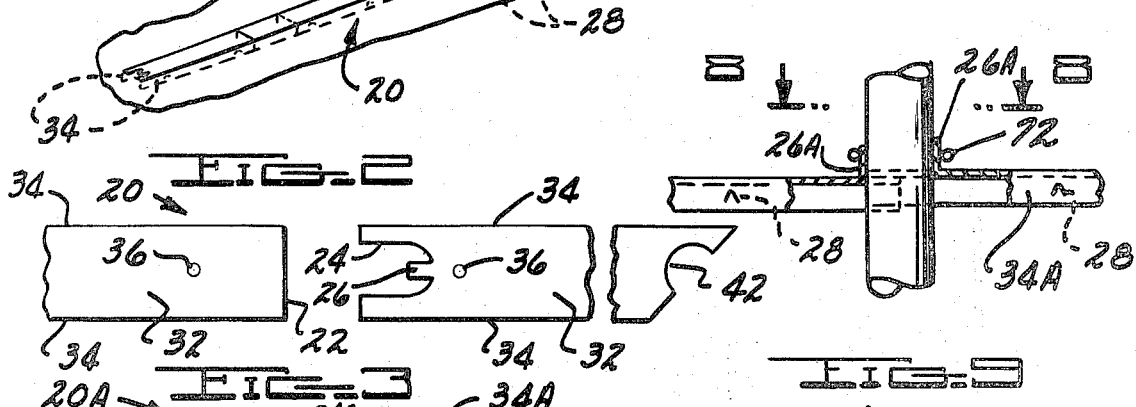
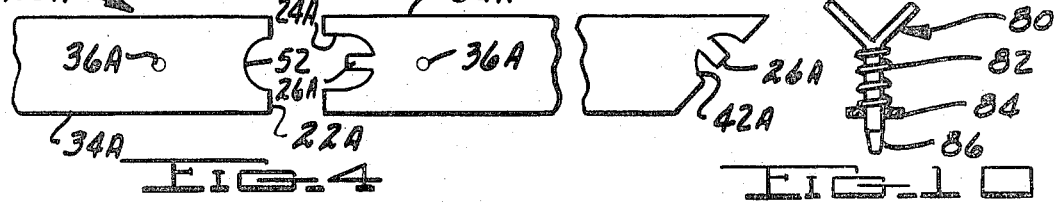
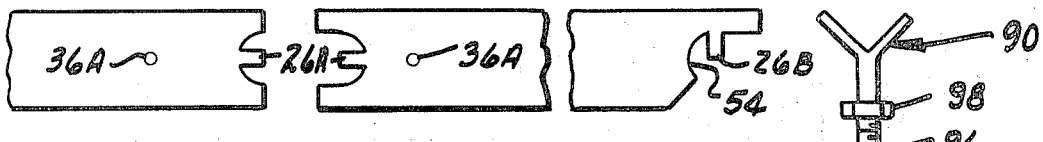
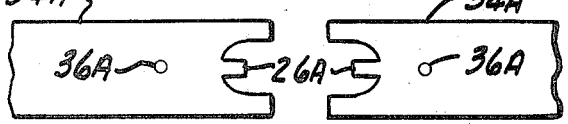
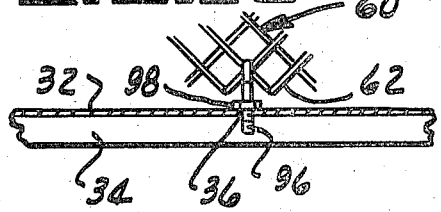
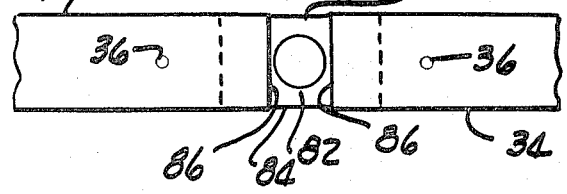
INVENTOR
GARY L. KEYS

WEED BARRIER FOR FENCING

BACKGROUND OF THE INVENTION

While the problem of weeds and vegetation growing beneath fences has long been with us, no satisfactory, inexpensive and permanent method of eliminating this irksome and unsightly problem has yet been devised. All of the known barrier structures are either very costly to install because of the high initial cost of the barrier or the difficulty which is encountered in positioning same beneath the fence, as well as the inability to maintain the barrier in a pre-determined desired position. The applicants proposed structure accomplishes that which was heretofore costly and time consuming in a simple and novel way, with positive results at a nominal cost.

AREA OF SEARCH

Lawn edging devices are usually found in Class 47, Sub-Classes 25 and 33, in Class 52, Sub-Class 102 and in Class 256, Sub-Classes 1, 19 and 32 respectively as well as other Classes. Representative patents located include U.S. Pat. Nos. 2,782,561 to R. A. Smith, 2,626,393 to M. Miller, 3,277,606 to F. Cohen, 3,384,351 to A. W. Turner, 3,393,897 to L. E. Wright, 3,484,989 to I. I. Lazinsky and number 3,515,373 to D. M. Abbe.

From the foregoing cited references, it will be apparent that the proposed invention of the applicant represents a substantial advance in the art.

It is therefore a primary object of the proposed factory pre-notched and tabed invention to provide a simple and inexpensive channel shaped barrier structure that can be installed beneath fencing previously erected or on new fencing installations with equal ease without the need of trenching.

Another object of the proposed invention is that no on the job cutting is required, since the channel shaped barrier members are telescopic when assembled end to end.

Still another object of the proposed invention is to provide forked "Y" shaped members to be positioned intermediate the fence wire and the channel shaped barrier members so as to hold the barrier means against the ground, while deformable lanced barbs are provided extend vertically upward from each of the downturned channel haped flanges so as to prevent the barrier members from lifting out of the ground, after the said lanced barbs are deformed outwardly on the job in angular relationship to the said flanges.

Another object of the proposed invention is the provision of rectangular tab members on the ends of each barrier, which when deformed upwardly on the job can be used to securely clamp the ends of the barrier members to each of the vertical fence post for positive positioning and holding said barrier members in proper position.

Still another object of the proposed invention is the the provision of a weed barrier which can be made of metal or plastic, wherein the underside thereof coated with growth inhibitor to further prevent weed growth, while the upper side can be factory pre-painted any desired color.

The foregoing and other objects of the invention can be accomplished by the provision of a weed barrier for installation beneath a fence, wherein the upper surface thereof is generally flat and has a plurality of factory pre-punched spaced openings therein, the edges of said flat upper surface are turned down slightly less than 90° so as to form a an inverted "U" shaped channel shape, while each of the turned down channel shaped flanges is lanced to provided an area which can be further deformed outwardly and upwardly so that when the barrier member is placed in the ground, the tabs formed by the lancing operation will prevent the weed barrier from moving out of the ground, the ends of the weed barrier may be of several configurations without departing from the spirit or scope of the invention, but in general the ends of the weed barrier will be pre-notched at the factory in the form of the fence post and the tab provided in the notch will be bent upwardly on the job to engage and be clamped to the said fence post by a suitable clamping member provided with the weed barrier members, the ends thereof will be of such shape and configuration that they will be interlocked when assembled in lineal lengths and will abut or interlock at each respective corner juncture.

Other objects of the proposed invention will appear in the following description and appended claims, reference being had to the accompanying drawings, forming a part of this specification, wherein like reference characters designate corresponding parts in the several views.

IN THE DRAWINGS

FIG. 1 is a perspective drawing of a fence structure which has a an inverted "U" shaped channel members forming the weed barrier of the proposed invention telescopically installed therebeneath.

FIG. 2 is an plan view of an inverted "U" shaped channel member a weed barrier which illustrates a non-symmetrical method of factory pre-notching same.

FIG. 3 illustrates another non-symmetrical method of factory pre-notching a weed barrier.

FIG. 4 shows still another method non symmetrical of factory pre-notching a weed barrier.

FIG. 5 delineates a generally symmetrical method of factory pre-notching a weed barrier.

FIG. 6 illustrates a modified form of the proposed invention which would be used for new fences, when the weed barrier is installed before the fence wire is secured to the fence posts.

FIG. 7 is an elevational view partly broken away wihich illustrates the telescopic overlapping of the channel shaped barrier members shown in FIG. 4, the tabs turned up and clamped.

FIG. 8 is a view taken along lines 8—8 of FIG. 7, illustrating a clamping member.

FIG. 9 is a view of a spring loaded forked hold-down member.

FIG. 10 is a view of threaded forked hold-down member.

FIG. 11 is a cross-sectional view through a weed barrier, wherein a forked hold-down member as shown in FIG. 10 is employed.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Looking now at FIG. 1 of the drawings, we observe a perspective view of a chain link fence structure 10, which has a an inverted "U" shaped channel member channel shaped weed barrier incorporating the teachings of the proposed invention. The channel shaped an inverted "U" shaped channel member weed barrier 20 which is illustrated in FIG. 1 is the same structure as is shown in plan view in FIG. 2. Thus, in this instance, the right end of the weed barrier 20 is cut off square as shown at 22 on the left hand member, which square end 22 abuts the fence posts 12 respectively, while the pre-notched end portion 24, with tab 26 bent upwardly on the job telescopically nests and overlaps the squared end portion 22, after which the clamp 72 (FIG. 8) is secured to hold the respective end sections of the weed barrier 20 down, as well as in a secure position, about the vertical fence post 12. A series of pre-lanced sections 28 are provided on each of the downturned channel shaped flanges 34 which depend from the generally flat central portion 32 thereof. Each of the downturned channel shaped flanges are of substantially the same depth and deformed slightly less than 90° so as to permit nesting of the product before sale for ease of shipment and mininal storage requirements. The lanced portions 28 may be of any desired configuration, although in the present instance are triangular and adapted to be deformed outwardly an upwardly on the job at the time the weed barrier is installed. This of course prevents the weed barrier 20 from moving out of the ground. Although the weed barried 20 shown in FIG. 2 has a plurality of centrally positioned openings 36 therein for receiving the "U" shaped forked holddown members, they are not illustrated in position in FIGS. 7 and 1, but in FIG. 11, of the drawings in a larger scale while the actual configuration of the "Y" shaped hold down members is shown in FIGS. 9 and 10 respectively. At the right end of FIG. 2 is illustrated the end configuration of a weed barrier as might be used at the corner intersection of two weed barrier members at a right angle intersection. A circular notch 42 is shown centrally positioned on a 45° angle.

FIG. 3 of the drawings is similar to FIG. 2, wherein the weed barrier member 20A illustrated at the left is pre-notched at the time of manufacture and before shipment to the consumer or sales outlet with a circular notch 52 centrally positioned on the square end 22A. The notched portion 24A has a rectangular tab 26A integral therewith and adapted to be bent upwardly on the job, so as to engage a fence post. The right end of the weed barrier as in FIG. 2 illustrates a semi-circular notch 42A which has a tab member 26A integral therewith and extending therefrom. While the tab is shown as being centrally positioned for intersection with a line post, the tab of course could be positioned in any location other than the central position as in the case of intersection with a corner post without departing from the spirit or scope of the invention. The installation of the weed barrier 20A would be substaitially the same as that previously described. A clamp for each post intersection and a "Y" shaped hold down member for each opening 36A on the top of the channel and disposed between the channel and the fence to hold the barrier member in position.

In FIG. 4 of the drawings, both ends of the weed barrier have factory made notches having tabs 26A located therein, while the extreme right end adapted for corner installation has a non-symmetrical configuration, with the corner portion 54 being adapted to engage the downturned flange of the mating part thereof. FIG. 5 of the drawings is similar to FIG. 4, while each of the end portions thereof are generally symmetrical.

FIG. 6 of the drawings illustrated a weed barier structure 80 which is similar to the structures previously described, although is adapted to be installed when the fence is built. Rectangular post barrier members 82 have downwardly depending flanges 84 which fit beneath the square cut barrier members 86, which rectangular post members 82 are positioned over each respective post and then put into the ground. The square cut barrier members 86 are then positioned therebetween and are of suitable lengths to span the distance between each of the fence posts. Corner members are formed in any desired angular relationship and incorporate the use of square cut barrier members.

FIG. 7 is a cross-sectional view through a barrier member as shown in connection with FIG. 4, wherein the tabs 26A are deformed upwardly on the job, while the notched portions of each respective barrier member, as well as the tabs 26A are moved into engagement with the fence post 12A. The upturned tabs 26A of notched portions are then securely clamped into position with the circular clamp 72 shown in FIG. 8. The triangular lanced tabs 28 are bent outwardly at assembly and act to maintain the weed barrier member in the ground after installation.

In FIG. 8 of the drawings, we see a plan view of a generally circular clamp 72, which is threaded on the outer ends 74 thereof and secured with a bolt 76. The clamp member 72 could also be of another configuration, or it could have circumferential serrations and held together with a resilient "O" ring or hog ring etc., without departing from the spirit of the invention.

FIGS. 9 and 10 are representative of two forked "Y" shaped barrier hold-down members 80 and 90 respectively. The cylindrical split end forked member 80 has a compression spring 182 and washer, 184 positioned thereon, while the end portion thereof is tapered at 186 for easy insertion into the openings 36 and 36A in the top of the barrier. The cylindrical split end forked structure shown in FIG. 10 is threaded on the end 96 and has a nut 98 positioned thereon.

In FIG. 11, the chain link fence 60 is shown, with the lowermost portion 62 thereof having the cylindrical split end forked member 90 engaging the fence wire, while the threaded end 96 has been inserted through opening 36 or 36A in the top 32 of the barrier member. The tension on the fence positions the forked member 90. while rotation of the threaded nut 98 acts to hold the barrier member against the ground. When the structure shown in FIG. 9 is used, the holding force on the barrier member 20 is maintained by the action of the compression spring 182. The "Y" shaped forked members 80 or 90, may of course be of any desired length or cross section, consistant with fence building standards.

From the foregoing description, it is apparent that the invention is simple and inexpensive to manufacture as well as to install. Th produce fills a long felt need and its sale price would be well within the economic reach of the total population.

Having thus described my invention, I claim:

1. In a weed barrier positioned on the ground intermediate the stretched fence between two fence posts of different spaced relationships for the purpose of restricting the growth of weeds, vegetation and plant life therebeneath, the combination of, at least two long narrow inverted "U" shaped flanged strips of generally uniform width and depth disposed between each two fence posts, with at least one end of one flanged strip having a factory notched opening therein to receive a fence post and at least one generally rectangular tab member integral with each strip, said tab being bent upwardly on the job as the need occurs to hold the telescopic overlying flanged member in position against a fence post, clamping means of suitable configuration being provided to maintain said flanged members in proper position between said fence posts so as to inhibit plant growth therebeneath, wherein the central top portion of each flanged strip is generally flat and has a plurality of spaced openings centrally located therein for receiving each end of a cylindrical split and "Y" shaped forked member therein, with the split portion thereof engaging the fence wire disposed between the fence posts, a compressing spring being positioned in engagement with the underside of the "Y" and on the top side of the flanged member so as to maintain a spring loaded relationship between th bottom of the fence and the flanged member.

2. A weed barrier as in claim 1, wherein the central top portion of each flanged strip is generally flat and has a plurality of spaced openings centrally located therein for receiving each end of a cylindrical split end "Y" shaped forked member, the lowermost end of said forked member being threaded and having a nut positioned thereon, the "Y" being inserted into the bottom of the fence, with the threaded portion being inserted into the spaced opening, rotation of the nut to engage the top of the flanged portion maintaining said member in proper position beneath the said fence wire and posts.

3. A weed barrier as in claim 1, wherein each of said flanges on said flanged member are turned down slightly less than 90° to permit nesting and reduce storage shipping and packaging requirements, each of the flange members having a plurality of factory lanced sections of triangular which extend upwardly when moved into position during the installation of the barrier so as to prevent the barrier from shifting out of the ground.

4. A weed barrier as in claim 3, wherein the underside thereof is coated with a herbicide so as to inhibit plant growth and thereby further enhance the the utility of the present invention.

5. A weed barrier as in claim 1, wherein each of the fence post notches may extend from one-half diameter to one and one-half diameters, with the integral tabs being non symmetrical in location.

* * * * *